US008700061B2

(12) United States Patent
Abdel-Kader et al.

(10) Patent No.: US 8,700,061 B2
(45) Date of Patent: *Apr. 15, 2014

(54) METHOD AND SYSTEM FOR PREDICTING SERVICE DROP IN A WIRELESS NETWORK

(75) Inventors: Sherif Abdel-Kader, Waterloo (CA); Vytautas Robertas Kezys, Hamilton (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,821

(22) Filed: Sep. 14, 2012

(65) Prior Publication Data

US 2013/0010778 A1 Jan. 10, 2013

Related U.S. Application Data

(63) Continuation of application No. 10/991,359, filed on Nov. 19, 2004, now Pat. No. 8,295,838.

(51) Int. Cl.
*H04W 24/00* (2009.01)

(52) U.S. Cl.
USPC ........................................ 455/456.1; 455/436

(58) Field of Classification Search
CPC ..... H04W 36/00; H04W 36/08; H04W 36/10; H04W 36/24; H04W 4/02; H04W 4/22; H04W 68/00
USPC .............................................. 455/436, 456.1
See application file for complete search history.

(56) References Cited

U.S. PATENT DOCUMENTS

| | | |
|---|---|---|
| 5,193,216 A | 3/1993 | Davis |
| 5,917,811 A | 6/1999 | Weaver, Jr. et al. |
| 5,995,830 A | 11/1999 | Amin et al. |
| 6,018,655 A | 1/2000 | Bartle et al. |
| 6,055,426 A | 4/2000 | Beasley |
| 6,330,438 B1 | 12/2001 | McClelland et al. |
| 6,631,263 B1 | 10/2003 | Corkery |
| 6,633,760 B1 | 10/2003 | Ham et al. |
| 6,745,031 B2 | 6/2004 | Chun et al. |
| 7,146,153 B2 | 12/2006 | Russell |
| 7,151,954 B2 | 12/2006 | Nagata |
| 7,171,216 B1* | 1/2007 | Choksi ........................ 455/456.1 |
| 2004/0142694 A1* | 7/2004 | Levy et al. ..................... 455/450 |
| 2004/0203424 A1 | 10/2004 | Akhteruzzaman |
| 2004/0203607 A1 | 10/2004 | Satapathy |

(Continued)

OTHER PUBLICATIONS

Paramvir Bahl et al.: "A Software System for Locating Mobile Users: Design, Evaluation, and Lessons," Microsoft Research, Apr. 2, 2000.

*Primary Examiner* — Patrick Edouard
*Assistant Examiner* — Shantell L Heiber
(74) *Attorney, Agent, or Firm* — Ridout & Maybee LLP

(57) ABSTRACT

A mobile wireless device for use in a wireless network, wherein the wireless network includes regular access points and border access points. The border access points are those access points situated at the edge of the campus or other physical facility associated with the wireless network and they define the edge of the coverage area of the wireless network. The mobile wireless device predicts a possible drop of an active service due to loss of coverage by recognizing when it has connected with a border access point. A warning is output to the user of the mobile wireless device. The mobile wireless device may further recognize if it is located on the exterior side of the border access point away from the interior of the wireless network.

20 Claims, 3 Drawing Sheets

(56) References Cited

U.S. PATENT DOCUMENTS

| | | | |
|---|---|---|---|
| 2004/0203863 A1* | 10/2004 | Huomo | 455/456.1 |
| 2004/0264395 A1* | 12/2004 | Rao | 370/311 |
| 2005/0048972 A1 | 3/2005 | Dorenbosch et al. | |
| 2006/0019609 A1 | 1/2006 | Finley, Jr. et al. | |
| 2006/0045056 A1* | 3/2006 | O'Hara, Jr. | 370/338 |
| 2006/0068731 A1 | 3/2006 | Seier | |

* cited by examiner

METHOD AND SYSTEM FOR PREDICTING SERVICE DROP IN A WIRELESS NETWORK

CROSS-REFERENCE TO RELATED APPLICATIONS

The present application is a continuation of U.S. patent application Ser. No. 10/991,359, filed Nov. 19, 2004, the contents of which are hereby incorporated herein by reference.

FIELD OF TECHNOLOGY

The present application relates to methods and devices for wireless real-time packet-based services and, in particular, to predicting drop of such services in a wireless network.

BACKGROUND INFORMATION

Wireless local area networks (WLANs), such as those defined by the IEEE 802.11 standard, are becoming more common on a business or university campus or other facilities in order to provide effective wireless coverage to a defined area. The WLANs function by having a large number of access points physically distributed throughout the campus and connected in to a network. The WLAN may be further connected to other networks, including for example the Internet or the public switched telephone network. The WLAN allows users to freely move about the campus and use a mobile wireless device to engage in services, including real-time packet-based services such as VoIP, as the device connection is switched from access point to access point.

When a user of a wireless device roams the campus, he or she may unknowingly reach the edge of the campus or other facility and begin to lose coverage. The WLAN has a limited coverage area, and users are not always familiar with the limits of the coverage area. Accordingly, a user may be engaged in an active service, such as a VoIP call, and suddenly lose his or her connection as the device goes out-of-coverage. The other party to the service, such as the recipient of the VoIP call, may initially be unaware that the mobile device user has become disconnected and is no longer available.

Therefore, it would be advantageous to provide for a mobile device that addresses, at least in part, one or more of the shortcomings of known devices.

BRIEF SUMMARY

The present application describes a mobile wireless device for use in a wireless network, wherein the wireless network includes regular access points and border access points. The border access points are those access points situated at the edge of the campus or other physical facility associated with the wireless network and they define the edge of the coverage area of the wireless network. The mobile wireless device predicts a possible drop of an active service due to loss of coverage by recognizing when it has connected with a border access point. A warning is output to the user of the mobile wireless device. The mobile wireless device may further recognize if it is located on the exterior side of the border access point away from the interior of the wireless network.

In one aspect, the present application provides a method of alerting a user of a wireless device to a possible drop of an active service by the wireless device in a wireless network having a plurality of access points for engaging in RF communications with the wireless device. The plurality of access points include a border access point that is located on an edge of the wireless network. The active service operates over a connection between the wireless device and one of the plurality of access points. The method includes steps of determining whether the connection is between the wireless device and the border access point, and triggering an alert to the user of the wireless device if the connection is determined to be with the border access point.

In another aspect, the present application provides a mobile wireless device for engaging in an active service within a wireless network having a plurality of access points for establishing RF communications with the mobile wireless device. The plurality of access points include a border access point located on an edge of the wireless network. The active service operates over a connection between the mobile wireless device and one of the plurality of access points. The mobile wireless device includes a communications subsystem for establishing the connection with the one of the plurality of access points and exchanging RF communications, a memory, and a processor associated with the memory and controlling the communications subsystem. The mobile wireless device also includes a service drop prediction module for alerting a user of the mobile wireless device to a possible drop of the active service. The service drop prediction module includes a border recognition component for determining whether the connection is between the mobile wireless device and the border access point, and a warning component for outputting an alert signal if the connection is determined to be with the border access point.

Other aspects and features of the present application will be apparent to one of ordinary skill in the art in light of the following detailed description and drawings depicting one or more embodiments.

BRIEF DESCRIPTION OF THE DRAWINGS

Embodiments will now be described, by way of example only, with reference to the attached Figures, wherein.

Like reference numerals are used throughout the Figures to denote similar elements and features.

DETAILED DESCRIPTION

Embodiments in accordance with the present application are described below. Certain embodiments refer to a wireless local area network (WLAN) and, in particular, a WLAN conforming to the 802.11 IEEE standard. It will be apparent from a review of the present application that the present application applies to any wireless network having a defined area and, accordingly, having border access points and non-border access point. In some embodiments, the wireless network may comprise a WLAN, a metropolitan area network (MAN) such as a network conforming to the 802.16 IEEE standard, or other a wireless network conforming to another standard and having a coverage limited to a defined area.

Figure 1:
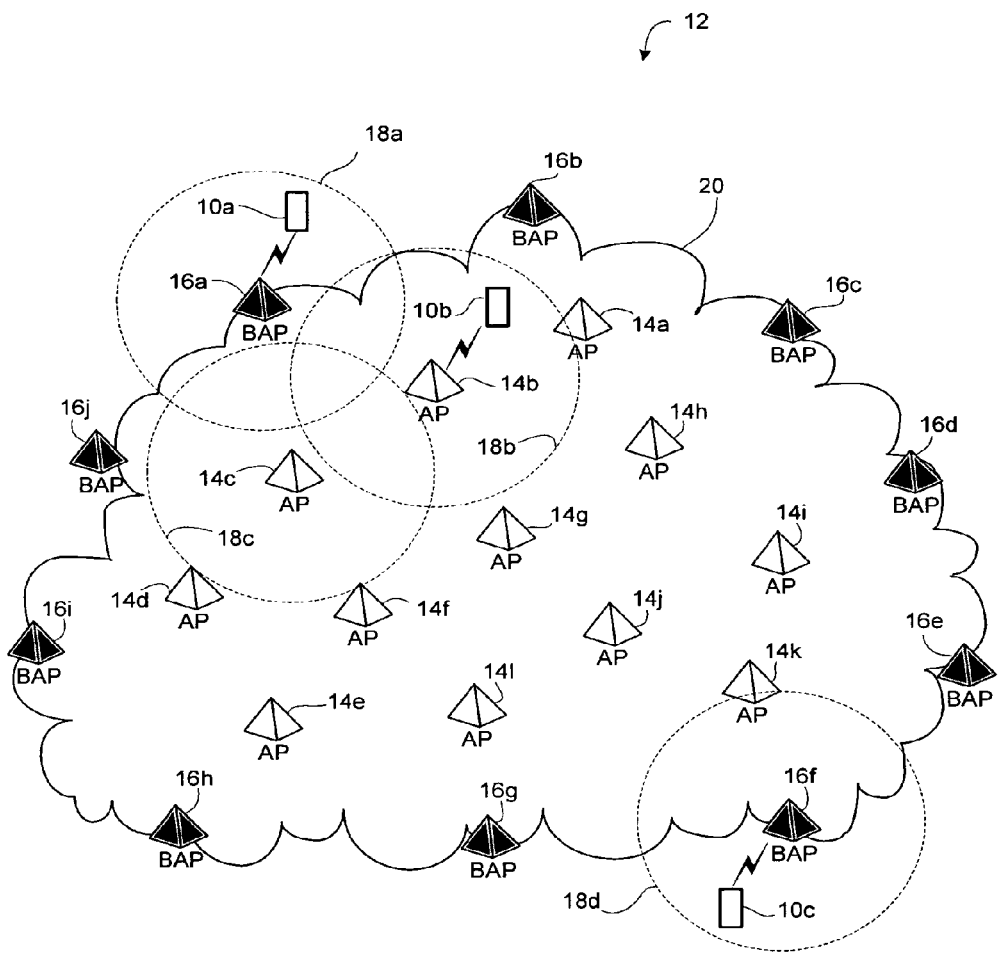
FIG. 1 diagrammatically shows a wireless local area network and mobile wireless devices.

Reference is first made to FIG. 1, which diagrammatically shows a wireless local area network (WLAN) 12. The WLAN 12 may be associated with a campus, building, or other facility. The WLAN 12 may comprise, for example, a wireless network conforming to IEEE 802.11 standards.

The WLAN 12 includes a plurality of access points 14,16. The access points (AP) 14, 16 are coupled together in a network 20. The network 20 may be coupled to a wide area network (WAN) (not shown), such as the Internet, and/or it may be coupled to the public switched telephone network (PSTN) (not shown). The access points 14, 16 each include an antenna and associated RF transceiver for engaging in wireless communication with a mobile wireless device 10.

Mobile wireless devices (shown individually as 10a, 10b, and 10c) each connect with and communicate over the network 20 through one of the access points 14, 16. As a device 10 roams the physical campus, active communications with an access point 14, 16 may switch over to an adjacent access point 14, 16 as the device 10 moves closer to the adjacent access point 14, 16. The switching of device communications from one access point 14, 16 to another may be based on the relative signal strength of the access points 14, 16 or on other factors, as will be understood by those of ordinary skill in the art.

The design, configuration, deployment, and operation of wireless local area networks such as WLAN 12, and the methods for conducting handovers of device communications and active services from access point to access point while roaming, are within the understanding of one of ordinary skill in the art.

In accordance with the present application, the access points 14, 16 include regular access points (shown individually as 14a-14l) and border access points (shown individually as 16a-16j). FIG. 1 distinguishes the border access points 16 from "regular" access points 14 using shading. The border access points (BAP) 16 comprise those access points which are located at the edge of the physical network coverage area as defined by the physical layout of the access points 14, 16.

Each access point 14, 16 has its own individual coverage area 18 (four are shown individually as 18a-18d) which is defined by its antenna pattern, physical environment, transmit power, and the effect that those factors have on signal propagation and attenuation. Adjacent access points, such as, for example access points 14b, 14c, and 16a, are positioned such that their respective coverage areas 18b, 18c, and 18a have a degree of overlap sufficient to avoid any significant gaps in WLAN 12 coverage in the physical campus area. The outer edges of the individual coverage areas 18 of the border access points 16 mark the edge of the campus WLAN 12 coverage area.

When a mobile device, say device 10a, approaches the edge of the WLAN 12, it will enter the coverage area of one of the border access points, such as border access point 16a. As the mobile device 10a moves away from the WLAN 12, the signal strength of the communications from the border access point 16a will drop and the quality of service experienced by the user of the mobile device 10a may deteriorate. If the user is engaged in an active service, such as, for example, a voice-over-IP call (VoIP), then the call may be abruptly terminated as the device 10a leaves the border access point 16a coverage area 18a. The user may be unaware of the reason for deteriorating quality of service or the reason for termination of the call.

To address, at least in part, these issues, in accordance with the present application the mobile device 10 attempts to predict a possible loss of coverage and warn the user.

In one embodiment, the mobile device 10 warns the user when the mobile device 10 connects with a border access point 16. For example, the mobile device 10 may be engaged in an active VoIP call over a connection with a regular access point 14. If the mobile device 10 moves away from the regular access point 14 and towards a border access point 16, then at some point the WLAN 12 switches the VoIP call over to the border access point 16, e.g. a connection or association may be established between the device 10 and the border access point 16, the service (in this case, the VoIP call) may then be switched to the new connection, and the old connection with the regular access point 14 is dropped. The mobile device 10 recognizes that its connection is to a border access point 16. On this basis, it recognizes that it may lose coverage since it is at the edge of the WLAN 12. Accordingly, the mobile device 10 generates an alert or warning to signal to the user that the VoIP call is now routed over a border access point 16.

The mobile device 10 may recognize that it is connected to a border access point 16 in a number of ways. For example, the mobile device 10 may include a list of border access points 16. The list may include the media access control (MAC) addresses of the border access points 16 associated with a given WLAN 12. In another embodiment, the border access points 16 may include an identifier embedded or encoded in their beacon signals.

When the mobile device 10 recognizes that it is connected with a border access point 16, then it may determine whether a service is active over a connection with the border access point 16. If there is an active service, such as for example a VoIP call, then the mobile device 10 outputs a sensible warning or alert to the user. The warning may be implemented in a variety of ways. It may comprise a beep or other audible signal. The audible signal may be injected into the voice data of the VoIP call or may be output separately from the audio of the VoIP call. The warning may also or alternatively be a visual or kinetic signal. For example, the warning may by output by way of display screen or LED. The warning might also be signalled using vibration or other kinetic signals.

The warning signal may be output once or may be output repeatedly. If output repeatedly, then the user may be permitted to turn off the warning through a keystroke, key combination, soft key or other input mechanism. The output of the warning signal may cease once the active service switches over to a regular access point 14 as the user roams back into the WLAN 12.

In another embodiment, the mobile device 10 recognizes whether it is associated with a border access point 16 and it then deduces whether the user is on the outside edge of the border access point 16 and moving away from the WLAN 12. In this embodiment, the signal level threshold that the system uses to determine whether to switch a service from one access point to another is set relatively high, meaning that a roaming mobile device 10 will switch to an adjacent access point relatively easily. This may be encouraged by setting the system scale to "small", which, in known manner, increases the signal level threshold for determining when to switch to a new access point. If this threshold is set relatively high, then the mobile device 10 may deduce that if the signal level of its communications with a border access point 16 drops below a predetermined level (which is equal to or lower than the threshold signal level for switching) then the user is likely located towards the exterior side of the border access point 16 distant from the WLAN 12. Otherwise, the mobile device 10 would have already switched over to an adjacent access point 14.

Based on this threshold determination, the mobile device 10 is able to determine that, not only is the user connected to a border access point 16, but the user is located towards the exterior side of the border access point 16. If these conditions are met, then the mobile device 10 outputs the warning signal. Accordingly, as a user roams within the WLAN 12 from access point 14 to access point 14, if the user reaches a border access point 16 and begins to walk away from the WLAN 12, then once the signal levels drop below the predetermined level the warning signal will alert him or her to the possible service drop.

In yet another embodiment, the mobile device 10 does not include a list of border access points 16 or receive an identifier from the border access point 16, but instead deduces that it is connected to a border access point 16. In particular, the mobile device 10 deduces that it is connected to a border access point 16 when the signal level drops below the predetermined level. If the mobile device 10 were located within the WLAN 12, then any service operating over a connection with an access point 14 having a low signal level would have been switched over to a closer access point 14 having better signal levels. Therefore, the mobile device 10 may deduce that it is connected to a border access point 16 and, moreover, that it is located on the exterior side of the border access point 16 away from the rest of the WLAN 12.

In another embodiment, there is more than one warning level. For example, a low level warning may be triggered upon connection with a border access point 16. The low level warning may comprise a flashing LED or other sensory output. If the mobile device 10 then also determines that it is moving away from the WLAN 12, for example by determining that the signal strength has dropped below the predetermined level, then the device 10 outputs a higher level warning. The higher level warning may include an audible signal, such as a periodic beeping, or other sensory output. In this embodiment, the user is given a low level warning when the device 10 associates with a border access point 16 and is given a more urgent warning when the device 10 roams away from the WLAN 12 toward the edge of the coverage area, thereby providing a more urgent warning when the possibility of a service drop is heightened. It will be appreciated that there may be multiple thresholds and warning signals.

In yet another embodiment, the mobile device 10 may pre-emptively release a service, such as a VoIP call. In some circumstances, the mobile device 10 may warn the user of a possible call drop, for example using one of the embodiments described above, and if the signal quality deteriorates sufficiently, then it may automatically release the call. To assess signal quality the mobile device 10 may determine whether the signal level falls below a second predetermined level, which is lower than the predetermined level associated with the warning, wherein the second predetermined level is established on the basis that it is likely to correspond to an unacceptable signal quality for a given service. Under these circumstances, the mobile device 10 may pre-emptively release the call and thereby terminate the active service rather than waiting for the connection to fail. If the connection to a mobile device were allowed to simply fail due to loss of coverage, thereby allowing the service to drop, then the other party at a remote termination point may be initially unaware that the mobile device had lost coverage. The determination to release a call may be based upon the signal level, a measurement of signal to noise ratio, or other factors.

It will be appreciated that the foregoing references to signal level and the comparison or assessment of signal level against predetermined thresholds or levels may be modified to suit certain applications or embodiments. In some embodiments, similar assessments may be made using packet loss ratio, as described in commonly owned co-pending U.S. patent application Ser. No. 10/991,514 entitled "Method and System for Identifying Degradation of a Media Service" filed concurrently herewith. In some embodiments, the above-described measurements and assessments may relate to signal-to-noise ratio. In an embodiment wherein the service operates using real-time transport protocol (RTP), the corresponding real-time transport control protocol (RTCP) packets may include packet statistics that may be used to make measurements or assessments in accordance with the present application. Other possibilities will be understood by those of ordinary skill in the art having regard to the description herein.

Figure 2:
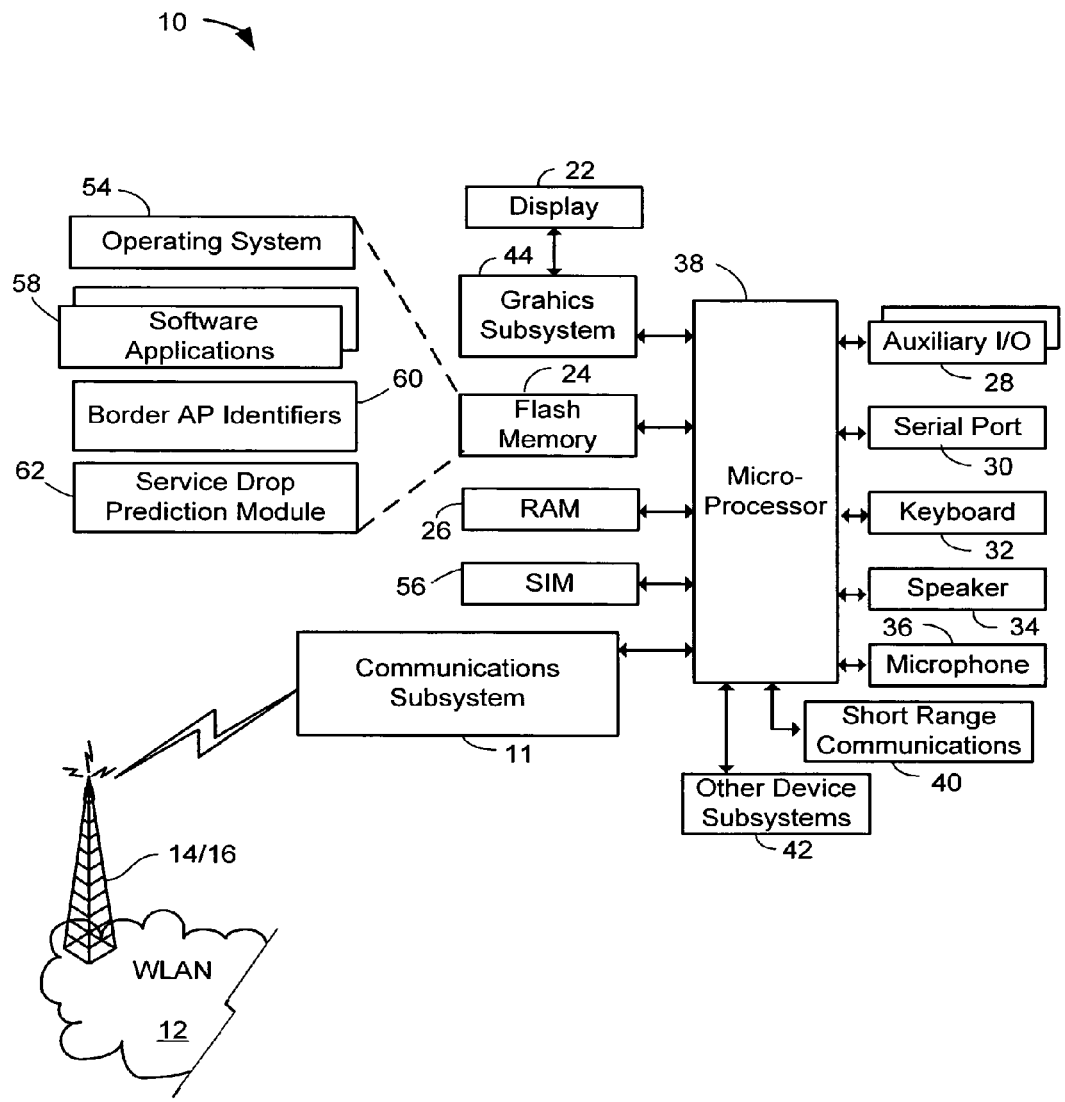
FIG. 2 shows a block diagram of an embodiment of a mobile electronic device.

Referring now to FIG. 2, there is shown a block diagram of an embodiment of the mobile device 10. The mobile electronic device 10 is a hand-held two-way mobile communication device 10 having data and/or voice communication capabilities. In an example embodiment, the device 10 has the capability to communicate with other computer systems on the Internet. In various embodiments, the mobile device 10 includes data communication devices, multiple-mode communication devices configured for both data and voice communication, mobile telephones, mobile communication devices, PDAs enabled for wireless communications, and other types of mobile wireless communication devices capable of engaging in real-time packet-based communication services such as, for example, VoIP. In the presently described embodiment, the mobile electronic device 10 is configured to operate within the WLAN 12. It should be appreciated however that the present application is in no way limited to these example types of devices and may be implemented in other devices.

The device 10 includes a communication subsystem 11. The communications subsystem 11 manages the wireless RF communications with access points 14, 16 (FIG. 1) in the WLAN 12. The communication subsystem 11 may include one or more antennae, a transceiver, a processing element like a digital signal processor and other components. As will be apparent to those skilled in the field of communications, the particular design of the communication subsystem 11 will be dependent upon the WLAN 12 in which the device 10 is intended to operate. The communication subsystem 11 manages the tasks of establishing a connection with an access point 14, 16 and sending and receiving packets over the connection.

The device 10 includes a microprocessor 38 that controls the overall operation of the device. The microprocessor 38 interacts with the communications subsystem 11 and also interacts with further device subsystems such as the display 22, flash memory 24, random access memory (RAM) 26, subscriber identity module (SIM) 56, auxiliary input/output (I/O) subsystems 28 (which may include a thumb-wheel, for example), serial port 30, keyboard or keypad 32, speaker 34, microphone 36, a short-range communications subsystem 40, and any other device subsystems generally designated as 42.

Some of the subsystems shown in FIG. 2 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Host operating system software 54 and various host software applications 58 used by the microprocessor 38 are, in one example embodiment, stored in a persistent store such as flash memory 24 or similar storage element. Host software applications 58 may include a wide range of applications, including a text messaging application, a ring tone application, a contacts application, and/or a game application. Those skilled in the art will appreciate that the host operating system 54, specific host applications 58, or parts thereof, may be temporarily loaded into a volatile store such as RAM 26. It is contemplated that received communication signals may also be stored to RAM 26.

The microprocessor 38, in addition to its operating system functions, enables execution of host software applications 58 on the device. A predetermined set of host applications 58 which control basic device operations, including at least voice communication applications for example, will normally be installed on the device 10 during manufacture. Further applications may also be loaded onto the device 10 through the WLAN 12, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a communication mode, a received signal such as a voice call, a text message, or web page download will be processed by the communication subsystem 11 and input to the microprocessor 38, which will preferably further process the received signal for output to the speaker 34 or the display 22, or alternatively to an auxiliary I/O device 28. A user of device 10 may also compose data items such as text messages for example, using the keyboard 32 in conjunction with the display 22 and possibly an auxiliary I/O device 28. Such composed items may then be transmitted over a communication network through the communication subsystem 11.

The serial port 30 in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads, including user interface information, to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices.

The device 10 includes a service drop prediction module 62. The service drop prediction module 62 interacts with the communication subsystem 11 to attempt to identify whether there is a likelihood of a loss of coverage and a consequent drop of an active service, as described above. The service drop prediction module 62 also interacts with the microprocessor 38 and/or the operating system 54 to trigger the output of a warning signal if a service is likely to be dropped. The warning signal may be output through the speaker 34, the display 22, an auxiliary I/O subsystem 28, or other device subsystems 42.

Although FIG. 2 depicts the service drop prediction module 62 as residing in flash memory 24 for execution by the microprocessor 38, those of ordinary skill in the art will appreciate that the service drop prediction module 62 may be incorporated as a part of the communication subsystem 11 and may be executed by a processor internal to the communication subsystem 11.

The service drop prediction module 62 includes a border recognition component for determining whether the mobile device 10 is associated with or connected with a border access point 16 (FIG. 1). It also includes a warning component, which in one embodiment determines whether a service, such as a VoIP call, is active on the mobile device 10 in response to the border recognition component and, if so, triggers the output of a warning signal.

In one embodiment, the mobile device 10 includes a list of border access point identifiers 60 stored in memory 24, 26. The border access point identifiers 60 may comprise the MAC addresses of the border access points or other indicia through which the mobile device 10 may distinguish border access points 16 from regular access points 14. In such an embodiment, the border recognition component compares the MAC address of an access point to which the device 10 connects with the stored list of border access point identifiers 60 to determine whether it is connected with a border access point 16. In another embodiment, the border access points 16 broadcast, for example through the beacon signal, the fact that they are border access points 16, and the border recognition component receives this broadcast information in order to make its determination.

In another embodiment, the service drop recognition module 62 includes a signal threshold component which determines whether the signal quality or level from the border access point 16 has dropped below a predetermined level or threshold, thereby indicating that the mobile device 10 is located towards the outer edge of the coverage area of the WLAN 12. The signal threshold component interacts with the warning component to output the warning signal in response to detection of a signal level below the predetermined level or threshold. As noted above, in some embodiments the border recognition component may include the signal threshold component wherein the border recognition component deduces that the device 10 is connected to a border access point 10 as a result of the signal level determination.

In one embodiment, the service drop recognition module 62 includes a service termination component, which preemptively terminates a call prior to losing coverage in circumstances where the signal quality has badly deteriorated and the likelihood of losing coverage is high. As described above, the service termination component may compare a measured signal strength (or signal to noise ratio, or other measure of signal quality) against a preset threshold. If the measured quantity falls below the threshold, then the service termination component may output a service release command. For example, in the context of a VoIP call the service termination component may output a call release command. In one embodiment, where the VoIP call is established using SIP (session initiation protocol), the call termination component may send a SIP BYE message.

Figure 3:
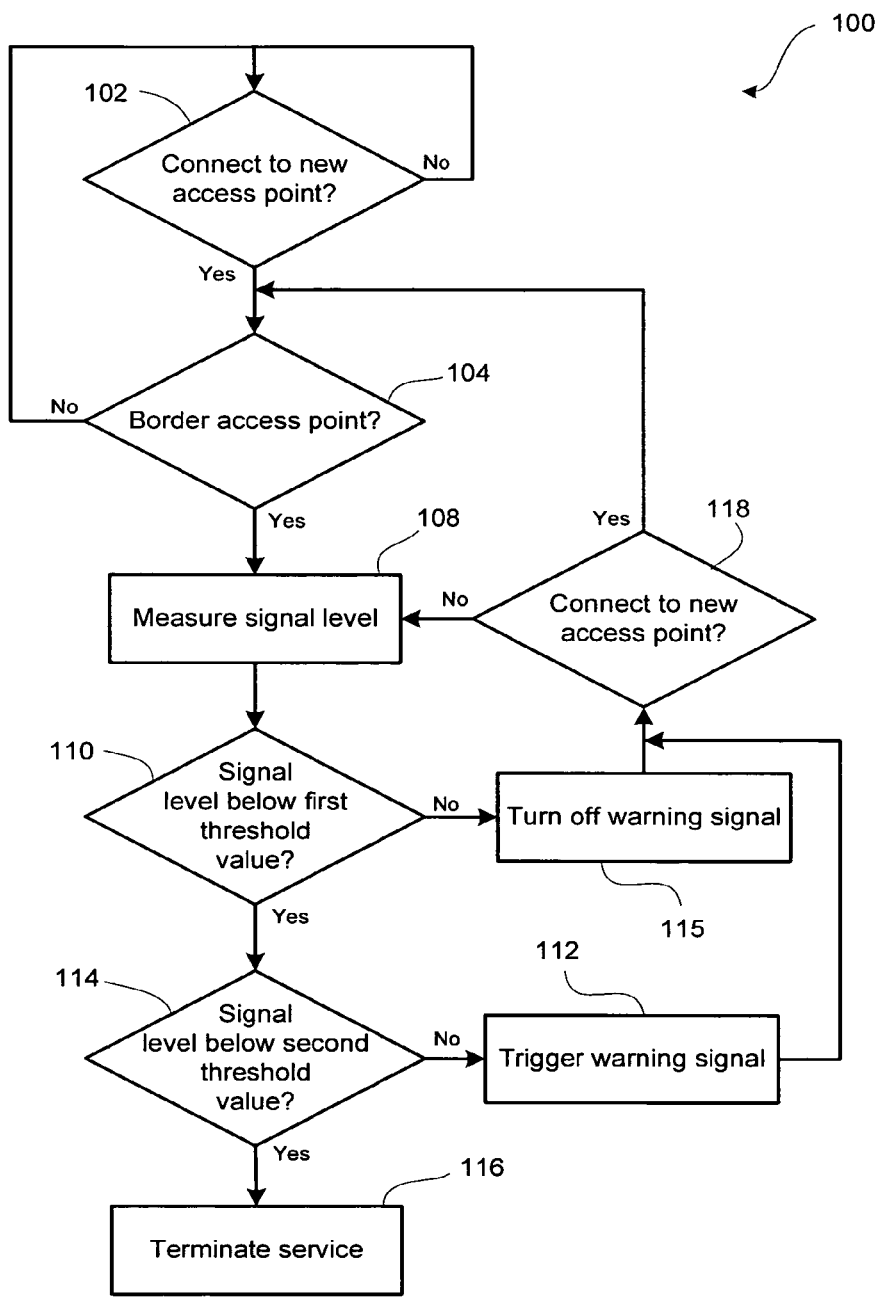
FIG. 3 shows, in flowchart form, a method of warning a user of a mobile device of a possible service drop.

Reference is now made to FIG. 3, which shows, in flowchart form, a method 100 of warning a user of a mobile device of a possible service drop.

The method 100 may be triggered by the device when an active service is established over the connection with the WLAN. In some embodiments, if there is no service active on the device, then the method 100 may not be triggered, since it may not be necessary to warn the user about an imminent loss of coverage if the user is not engaged in an active service.

In step 102 of the method 100 the device awaits association or connection to a new access point. The device may already be connected to an access point in the WLAN and the user of the device may be physically roaming in the WLAN environment. Accordingly, the WLAN may switch the connection with the device to another access point. The switching may be due to a better signal level at the new access point, load balancing, and/or other factors. If the device has switched to a new access point or newly established a connection with an access point to establish an active service, then the method continues to step 104.

In step 104, the device determines whether it is connected to a border access point. As described above, the device may make this determination on the basis of a list of border access point identifiers or on the basis of a broadcast from the border access point. If the device is not connected to border access point, then the method 100 returns to step 102. If the device is connected to a border access point, then the method continues to step 108.

In step 108, the device measures the signal level received from the border access point. The measurement of signal level, or equivalent measurements of signal quality factors, will be within the understanding of one of ordinary skill in the art. The device then compares the measured signal level with a predetermined threshold value in step 110.

In some embodiments, if the measured signal level falls below the threshold value then the method 100 may next include step 114, wherein the device determines whether the signal level falls below a second lower threshold value. If so, then the device may pre-emptively terminate the active service in step 116.

If, in step 114, it is found that the measured signal level does not fall below the threshold value, then the method 100 proceeds to step 112. Since the measured signal level falls below the first threshold level (step 110) but not below the second threshold value (step 114), the device triggers a warning signal in step 112. As described above, the warning signal may include an audio, visual, and/or kinetic signal.

If, in step 110, the measured signal level does not fall below the first threshold, then the method continues to step 115, wherein the device turns off any warning signals that may have been previously triggered as a result of step 112.

After step 115 or step 112, as the case may be, the device evaluates whether it has switched its connection to a new access point in step 118. If the device has not switched its connection to a new access point, i.e. if it remains on the border access point, then the method 100 returns to step 108 to continue measuring the signal level in order to assess whether the device is leaving the WLAN coverage area.

On the other hand, If in step 118 it is determined that the device has switched its connection to a new access point, then the method 100 jumps back to step 104 to evaluate whether the new access point is also a border access point.

It will be appreciated that the foregoing method 100 reflects a method wherein the output of a warning signal is based upon connection with a border access point and finding that the signal level has fallen below a first threshold value. In other embodiments, variations of the method 100 may eliminate certain steps or add other steps. For example, in one embodiment, the warning signal may be triggered upon finding that the device is connected with a border access point and it may not evaluate signal level at all. Other variations will be apparent to one of ordinary skill in the art having regard to the description herein.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method for a wireless device configured to connect to a wireless network having a plurality of access points for engaging in RF communications with the wireless device, the plurality of access points including at least one border access point, the at least one border access point located on an edge of the wireless network, the method comprising:
   storing a list of at least one designated border access point identifier in memory on the wireless device, the list including only designated border access point identifiers;
   receiving an access point identifier from an access point to which the wireless device is connected; and
   when the received access point identifier matches one of the least one designated border access point identifier in the list, outputting an alert on the wireless device.

2. The method of claim 1, wherein the at least one designated border access point identifier comprises a media access point (MAC) address.

3. The method of claim 1, further comprising outputting a second alert conditional on a determination that a signal strength associated with a connection between the access point and the wireless device is lower than a first predetermined threshold.

4. The method of claim 3, wherein the second alert indicates the wireless device is connected to an access point matching the list of at least one designated border access point identifier and that a service drop is predicted.

5. The method of claim 1, wherein outputting the alert is conditional on a determination that a service is active over a connection between the access point and the wireless device.

6. The method of claim 5, wherein the active service comprises a voice-over-IP call.

7. The method of claim 1, further comprising terminating a service operating over a connection between the access point and the wireless device when a signal strength associated with a connection between the access point and the wireless device is lower than a second predetermined threshold.

8. The method of claim 1, further comprising discontinuing the alert if the wireless device connects to a second access point.

9. The method of claim 1, wherein the alert is an auditory output, a visual output, or a kinetic output.

10. The method of claim 1, wherein the alert indicates the wireless device is connected to an access point matching the list of at least one designated border access point identifier.

11. A wireless device for connecting to a wireless network having a plurality of access points for engaging in RF communications with the wireless device, the plurality of access points including at least one border access point, the at least one border access point located on an edge of the wireless network, the wireless device comprising:
   a communications subsystem for establishing a connection with one of the plurality of access points;
   a memory storing a list of at least one designated border access point identifier, the list including only designated border access point identifiers;
   an output device;
   a processor configured to output an alert on the output device when an access point identifier received from an access points to which the wireless device is connected to matches one of the at least one designated border access point identifier in the list.

12. The wireless device of claim 11, wherein the access point identifier comprises a media access point (MAC) address.

13. The wireless device of claim 11, wherein the processor is configured to output a second alert based on a determination that a signal strength associated with the connection is lower than a first predetermined threshold.

14. The wireless device of claim 13, wherein the second alert indicates the wireless device is connected to an access point matching the list of at least one designated border access point identifier and that a service drop is predicted.

15. The wireless device of claim 11, wherein the processor is configured to output the alert is based on a determination that a service is active over the connection.

16. The wireless device of claim 15, wherein the active service comprises a voice-over-IP call.

17. The wireless device of claim 11, wherein the processor is configured to terminate a service operating over the connection when a signal strength associated with the connection is lower than a second predetermined threshold.

18. The wireless device of claim 11, wherein the processor is configured to discontinue the alert if the wireless device connects to a different access point.

19. The wireless device of claim 11, wherein the output device outputs an auditory output, a visual output, or a kinetic output.

20. The method of claim 11, wherein the alert indicates the wireless device is connected to an access point matching the list of at least one designated border access point identifier.

* * * * *